United States Patent Office 3,709,977
Patented Jan. 9, 1973

3,709,977
REMOVAL OF SO₂ FROM GAS STREAMS
John F. Villiers-Fisher, Kendall Park, N.J., assignor to Chemical Construction Corporation, New York, N.Y.
Filed Nov. 16, 1970, Ser. No. 89,868
Int. Cl. C01b *17/60, 17/56*
U.S. Cl. 423—244        6 Claims

ABSTRACT OF THE DISCLOSURE

Sulfur dioxide is removed from a gas stream which also contains sulfur trioxide, by contacting the gas stream with a solid basic ion exchange resin. The gas stream is initially contacted with an alkali prior to contact with the resin, to remove sulfur trioxide and prevent sulfur trioxide adsorption by the resin, which would deplete resin activity and result in a tightly bound chemical union which prevents resin regeneration by simple thermal means.

BACKGROUND OF THE INVENTION

Field of the invention

The invention relates to the removal and recovery of sulfur dioxide from gas streams such as waste gas streams discharged from sulfuric acid production facilities, smelters, and steam power plants which burn sulfur-containing coal or oil or the like, in which the gas stream contains sulfur trioxide as well as sulfur dioxide. The invention is particularly applicable to the prevention of air pollution caused by the discharge of sulfur dioxide-containing waste gas streams into the atmosphere.

Description of the prior art

Accompanying our nation's industrial and economic growth, along with increased goods and affluence, is the serious problem of the pollution of the environment. The air, especially is becoming increasingly polluted with contaminants such as carbon monoxide, hydrocarbons, nitrogen oxides and sulfur oxides, and man is becoming more alarmed about the quality of the air he breathes. The virtual complete elimination of a major source of one of these pollutants, namely sulfur oxides, is achieved by the present invention.

Numerous types of solid absorbents and adsorbents have been suggested for the removal of sulfur dioxide or other acidic compounds from gas streams. Various types of resins have been proposed in U.S. Pats. Nos. 3,330,621 and 2,285,750 and British Pat. No. 805,853. Silica gel is employed as an absorbent in U.S. Pats Nos. 2,762,452; 1,798,733 and 1,335,348. Carbon or charcoal are suggested for this purpose in U.S. Pats. Nos. 3,473,297; 3,440,007; 3,398,509; 3,345,125 and 2,992,895.

The prior art recited supra, however, contains no method for removal of sulfur dioxide and sulfur trioxide from gas streams which is entirely satisfactory. Effluent stack gases which have been scrubbed by these prior art methods still contain unsatisfactory levels of sulfur pollutants and the problem is especially acute in industries producing sulfur-related compounds such as sulfuric acid. Existing sulfuric acid plants can reduce their emissions of sulfur dioxide simply by altering operating conditions, but the control is limited to about 2,000 parts per million of sulfur dioxide. The dual absorption process can further lower sulfur dioxide emission to about 500 parts per million. But 500 parts per million of sulfur dioxide renders the surrounding air unhealthy.

SUMMARY OF THE INVENTION

In the present invention, a gas stream containing sulfur dioxide and sulfur trioxide is processed for the removal of sulfur oxides in an improved manner, so that a gas stream free of sulfur oxides is produced which may be safely discharged to the atmosphere without causing air pollution, or utilized for any desired purpose. The process basically entails the adsorption of the sulfur dioxide on a solid basic ion exchange resin, and the prevention of premature decrease of resin activity or conversion of the resin to an inactive state. It has been determined that the decrease in resin activity, or inability to readily regenerate the resin, is due to the concomitant adsorption or absorption of sulfur trioxide by the resin. In most instances sulfur trioxide is a viable component in the gas stream to be treated for sulfur dioxide removal, and if the sulfur trioxide is not removed prior to contact of the gas stream with the resin, the sulfur trioxide forms a tightly bound chemical union with the resin which rapidly depletes resin activity and produces an inactive resin which is difficult to regenerate. The gas stream is initially treated for sulfur trioxide removal by contact with an alkali, which substantially completely removes the sulfur trioxide from the gas stream due to the highly acidic nature of sulfur trioxide. Numerous types of solid alkalis or aqueous alkaline solutions may be employed for this purpose, as will appear infra. The resultant gas stream, now substantially free of sulfur trioxide, is passed in contact with the solid basic ion exchange resin for sulfur dioxide removal. The final resulting gas stream may now be safely discharged to the atmosphere without causing air pollution, or utilized for any desired purpose. The resin is regenerated by contacting the resin bed with heated pre-dried air, so as to evolve a sulfur dioxide-rich air stream which may be processed by refrigeration or the like to recover product sulfur dioxide, or in instances when the treated gas stream is the tail gas of a sulfuric acid facility, then the air stream which regenerates the resin would be the air from the drying towers which after stripping the sulfur dioxide from the resin is continued on to the sulfuric acid facility for utilization as a supplement to the sulfur burned for sulfuric acid manufacture.

The principal advantage of the invention is that solid basic ion exchange resins may be commercially employed to treat gas streams containing sulfur trioxide as well as sulfur dioxide, for the removal of sulfur dioxide, without diminishing the activity or useful life of the resin. Another advantage is that air pollution due to sulfur dioxide emission is prevented in a more economical manner. A further advantage is that mixed waste gas streams containing sulfur trioxide as well as sulfur dioxide may be processed for the removal of sulfur oxides in a more efficient manner.

It is an object of the present invention to prevent air pollution due to sulfur dioxide emission.

Another object is to treat gas streams containing sulfur dioxide and sulfur trioxide in an improved manner, for the removal of sulfur oxides.

An additional object is to provide an improved process for the removal of sulfur dioxide from a gas stream using a solid basic ion exchange resin.

A further object is to prevent the inactivation of solid basic ion exchange resins when employed for the selective removal of sulfur dioxide from gas streams.

An object is to provide an improved process for the treatment of waste tail gas derived from sulfuric acid production facilities, so as to prevent air pollution due to the discharge of tail gas.

DESCRIPTION OF THE DRAWING AND PREFERRED EMBODIMENTS

Referring now to the drawing, a flowsheet of a preferred embodiment of the invention as applied to the treatment of waste tail gas from a sulfuric acid production facility is presented. Sulfur stream 1 is burned with pre-dried process air stream 2 in combustion zone 3 of a sulfuric acid production facility, to form a hot sulfur dioxide-containing gas stream which is cooled in a waste heat steam boiler, not shown, within zone 3. A dry air stream 4 rich in sulfur dioxide and derived from the process of the present invention as will appear infra is added to the main cooled process gas stream within zone 3, or is employed in conjunction with stream 2 to support the combustion of stream 1, or is provided instead of stream 2, and the combined gas stream flows through catalysis zone 5, in which sulfur dioxide is catalytically oxidized to sulfur trioxide, and absorption zone 6 in which the converted gas stream is scrubbed with oleum or concentrated sulfuric acid typically of 98% acid strength, to selectively absorb sulfur trioxide. Product oleum or concentrated sulfuric acid is withdrawn from zone 6 via stream 7, which is passed to product utilization.

A residual waste tail gas stream 8 is also discharged from zone 6. Stream 8 typically contains about 0.5% by volume of residual sulfur dioxide, together with lesser amounts of sulfur trioxide and an entrained sulfuric acid mist. Stream 8 is heated in heat exchanger or heater 9 to a temperature typically in the range of 70° C. to 140° C., in order to vaporize or evaporate the contained acid mist. The resultant hot gaseous stream 10 discharged from heater 9 is now devoid of liquid droplets, and contains sulfur dioxide and sulfur trioxide as gaseous components, together with minor proportions of water vapor and oxygen, and balance nitrogen. Stream 10 is now processed in accordance with the present invention, by passing stream 10 through unit 11 for contact with an appropriate inorganic alkali material which selectively absorbs and reacts with sulfur trioxide to form a solid or dissolved sulfate salt or the like, and thus selectively removes sulfur trioxide from the gas stream. Stream 10 contacts alkali stream 12 within unit 11. Stream 12 preferably consists of a solid alkali or a mixture of solid alkalis, such as calcium oxide, calcium hydroxide, magnesium oxide, magnesium carbonate, calcium carbonate, sodium hydroxide, sodium carbonate, potassium hydroxide, potassium carbonate, dolomite, magnesite, etc., however in some instances stream 12 may consist of an aqueous alkaline solution or slurry containing a dissolved alkali component such as sodium hydroxide, sodium carbonate, potassium hydroxide or potassium carbonate. When stream 12 is a liquid or contains a liquid phase, unit 9 and its function may be omitted since intensive gas scrubbing in unit 11, which may be a venturi configuration of gas scrubber, will serve to remove acid mist. In most instances however, stream 12 will preferably be a solid alkali and unit 9 and its function will be included in the process. The resulting solid alkali or alkaline solution containing absorbed sulfur trioxide in the form of a sulfate or the like is removed from unit 11 via stream 13, which is passed to waste disposal or selective removal of sulfate, not shown, prior to recycle of unreacted alkali via stream 12. Some sulfite may also form in unit 11 due to initial reaction of alkali with sulfur dioxide, however any sulfite formed is converted in situ to sulfate due to subsequent reaction with sulfur trioxide, resulting in the evolution of the sulfur dioxide into the gas stream at equilibrium conditions.

The resulting hot tail gas stream 14 discharged from unit 11 is now substantially devoid of sulfur trioxide, and may be safely contacted with the solid basic ion exchange resin, after cooling in order to prevent thermal degradation of the resin and to achieve greater sulfur dioxide adsorption. Stream 14 is passed through heat exchanger or cooler 15, for indirect heat exchange with cooling water, circulated atmospheric air or the like, and the resulting cooled tail gas stream 16 discharged from unit 15 is now at a temperature preferably below 50° C., and typically in the range of 25° C. to 45° C. Stream 16 passes via stream 17 through open control valve 18, and then passes via streams 19 and 20 into the resin bed adsorber 21 above the lower resin bed 22.

The solid basic ion exchange resin bed 22 contains discrete solid particles of any suitable basic ion exchange resin, which preferably consists of a cross-linked organic polymer containing amine or imine groups. Among the resins which may be effectively employed in the present invention are resins produced by condensing an aldehyde, e.g., formaldehyde, acetaldehyde, propionaldehyde, butyraldehyde, cinnamyl aldehyde, furfural, etc., with one or more amino compounds or materials such as urea, thiourea, dicyandiamide etc., or with other active components such as phenol, aniline, phenylene diamine, quinoline, etc. Condensation products usable as resin bed 22 may be produced by any suitable process and with any desired combining ratio of aldehyde to other reactive materials, from 1:1 up to 5:1 or even higher.

Specific resins usable in the invention include guanidine-aldehyde condensation products, obtainable by the use of guanidine salts such as the nitrate, carbonate, etc.; biguanide-aldehyde condensation products; substituted biguanide, such as phenyl biguanide-aldehyde condensation products; guanyl urea-aldehyde condensation products; m-phenylene diamine-aldehyde condensation products; m-ethylaminobenzene-aldehyde condensation products; 5-alkyl-m-phenylene diamine-aldehyde condensation products; aniline-aldehyde condensation products; m-toluidine-aldehyde condensation products; sym-m-xylidine-aldehyde condensation products; alkali treated asphaltic material; or synthetic resins obtained by the copolymerization of any vinyl-pyridine, vinyl-alkylpyridine or mixtures thereof, with bifunctional monomers, such as divinylbenzene or other vinylic compounds in suitable proportions. Preferably three-dimensional cross-linked polymers will be used, for instance, the resins derived from the polymerization of 2-methyl-5-vinylpyridine with paradivinylbenzene whereby preferably about 70 parts by weight of 2-methyl-5-vinylipyridine are reacted with about 30 parts by weight of paradivinylbenzene.

It is unimportant for the purpose of the present invention in which manner the resin is obtained and how the same is subdivided into discrete solid particles of suitable size and shape. Any one of the methods known in the art for this purpose may be utilized. For instance, solid blocks of the resin could be produced and could then be reduced in size, or the polymerization or condensation could be carried out so as to obtain beads of the resins.

Stream 20 flows downwards through resin bed 22, and sulfur dioxide is selectively adsorbed from the gas stream by the basic ion exchange resin in bed 22. The resulting purified gas stream discharged below bed 22 is now substantially free of sulfur oxides and may be safely discharged to the atmosphere without causing air pollution. The purified gas is removed from below bed 22 and discharged from unit 21 via stream 23, which passes via stream 24, open control valve 25 and stream 26 to stream 27 for atmospheric discharge via a stack or the like, not shown.

During the operation of bed 22 for sulfur dioxide removal, an alternate resin bed within unit 21 is regenerated using pre-dried heated air. An air stream 28, which usually consists of ambient atmospheric air, is processed for water vapor removal. Stream 28 is typically passed into drying tower 29 below gas-liquid contact means 30, which usually consists of a bed of spherical, ring or saddle-type packing, or sieve trays, or bubble cap plates or the like. The air stream rises through bed 30 countercurrent to a downflowing liquid water vapor absorbent phase which is admitted into unit 29 above bed 30 as stream 31, which preferably consists of concentrated sulfuric acid, typically of 93% acid strength. The downflowing liquid sulfuric acid absorbs water vapor from the air stream by direct contact absorption, and the resultant slightly diluted acid is removed from the bottom of unit 29 via stream 32 which may be at least partially recycled, preferably after being fortified to proper strength by the addition of 98% sulfuric acid or oleum.

The dried air discharged from unit 29 above bed 30 via stream 33 is preferably divided into stream 2, which is utilized as described supra, and stream 34, which is employed for resin bed regeneration in accordance with the present invention. In some cases, all of stream 33 may flow via stream 34, and stream 2 may be omitted. Stream 34 is heated in heater or heat exchanger 35, which may employ steam or a suitable hot process fluid for indirect heat exchange with the dried air. The resulting hot dry air stream 36 discharged from unit 35 is now typically at an elevated temperature in the range of 80° C. to 130° C., and stream 36 passes via stream 37, open control valve 38, stream 39 and stream 40 into unit 21 above the upper resin bed 41, which is similar in configuration, composition and function to the lower bed 22, except that bed 41 is laden with, and may be saturated with adsorbed and absorbed sulfur dioxide, derived from a previous phase in the cycle in which tail gas was passed through bed 41 instead of bed 22. The hot dry air stream 40 flows downwards through bed 41 and heats the bed 41, and entrains and desorbs sulfur dioxide from the resin bed. The resulting gaseous mixture of desorbed sulfur dioxide and dry air is discharged below bed 41 and removed from unit 21 via stream 42, which passes via stream 43, open control valve 44 and stream 45 to stream 58 for utilization as stream 4 and stream 59. Stream 58 is preferably divided into stream 59, which is recycled to heater 35 during most of the regeneration cycle to provide additional regeneration gas volume to resin bed 41, and stream 4. In this embodiment of the invention, stream 36 is a hot combined gas stream containing components derived from streams 34 and 59. In instances when stream 8 is not derived from a sulfuric acid plant, or in other suitable instances, stream 4 may not be recycled to a sulfuric acid facility but instead stream 4 may be refrigerated to selectively condense product liquid sulfur dioxide or processed in any suitable manner to recover a valuable sulfur-containing product.

Control valves 46, 47, 48 and 49 are also provided in the system and these valves are indicated as being in the closed position in this phase of the operating cycle. When the functions of the beds 22 and 41 are reversed, due to saturation of bed 22 with sulfur dioxide and resultant buildup of sulfur dioxide in stream 27, and/or due to complete regeneration of bed 41, the control valves 46, 47, 48 and 49 are opened and control valves 18, 25, 38 and 33 are closed. As a result, stream 16 will then flow via stream 50, valve 47, stream 51 and stream 40 to the upper resin bed 41 for sulfur dioxide absorption, with purified tail gas being discharged to atmosphere via stream 42 and 52, valve 48 and streams 53 and 27. In addition, stream 36 will then flow via stream 54, valve 46, stream 55, and stream 20 to the lower resin bed 22 for desorption of sulfur dioxide and bed regeneration, with the air and desorbed sulfur dioxide mixture flowing via stream 23, stream 56, valve 49 and stream 57 to stream 58.

Numerous alternatives within the scope of the present invention, besides those alternatives mentioned supra, will occur to those skilled in the art. The invention is generally applicable to gas streams derived from various sources as mentioned supra and which contain sulfur trioxide as well as sulfur dioxide. In instances when the initial gas stream contains entrained solid particles such as fly ash, the entrained solids will generally be removed prior to gas processing, by filtration, scrubbing with water or the like, electrostatic precipitation, or any other suitable means.

Stream 14 may be passed through a gas-to-gas heat exchanger and in indirect heat exchange with stream 8, to attain cooling of stream 14 and heating of stream 8. During the beginning of the regeneration cycle, a portion of the hot air discharged from the resin bed, such as stream 42 as shown in the figure, may be recycled to the same bed to provide a faster heating of the bed, in which case a portion of stream 42 would be added to stream 40. In addition, at the end of the regeneration cycle, when the hot resin has been purged substantially free of sulfur dioxide, the flow of stream 34 or the operation of heater 35 may be terminated and at least a portion of the relatively cooler air stream 2 may be passed into bed 41 via stream 40, so as to produce a more rapid cooling of the bed 41 prior to the onset of the reversal of the cycle, in which bed 41 functions to absorb sulfur dioxide from tail gas at a lower temperature. Stream 2 may be omitted in some cases, with all of stream 33 flowing via stream 34. The flow of stream 59 may be terminated during final periods of the regeneration cycle, with all of stream 58 flowing via stream 4.

An example of a typical industrial application of the present invention will now be described.

EXAMPLE

The invention was applied to the treatment of the tail gas from a 400 tons per day contact sulfuric acid plant. Following is data relative to principal process streams.

| Stream number | Temperature, °C. | Equivalent flow rate [1] | Component in gas stream | Content of component, volume percent or p.p.m. |
|---|---|---|---|---|
| 8 | 81 | 708 | Sulfur dioxide | 0.45%. |
| | | | Sulfur trioxide | 0.007%. |
| | | | Oxygen | 10.35%. |
| | | | Nitrogen | 89.2%. |
| 10 | 127 | | | |
| 16 | 38 | | Sulfur trioxide | 0.0%. |
| 27 | 42 | | Sulfur dioxide | 0.005% average. |
| | | | Sulfur trioxide | 0.000% average. |
| | | | Oxygen | 10.4%. |
| | | | Nitrogen | 89.6%. |
| 33 | 49 | 792 | Sulfur dioxide | 0.0%. |
| | | | Sulfur trioxide | 0.0%. |
| | | | Oxygen | 21.0%. |
| | | | Nitrogen | 79.0%. |
| 4 | 42–98–49 | 792 | Sulfur dioxide | Cyclic 50 p.p.m. to 2% to 5 p.p.m. |
| | | | Sulfur trioxide | 0.00%. |
| | | | Oxygen | 21.0% initially and finally. |
| | | | Nitrogen | 79.0% initially and finally. |
| 59 | 42–98–49 | 623 | Sulfur dioxide | Cyclic 50 p.p.m. to 2% to 5 p.p.m. |
| | | | Sulfur trioxide | 0.00%. |
| | | | Oxygen | 21.1% initially and finally. |
| | | | Nitorogen | 79.0% initially and finally. |

[1] At 15° C., 1 atm. cubic meters per minute.

Heater 35 was not operated during the last 25% of refrigeration cycle. Stream 2 was omitted in this example, with all of stream 33 flowing via stream 34.

I claim:

1. A process for the removal of sulfur dioxide and sulfur trioxide from a gas stream which comprises contacting a first gas stream containing sulfur dioxide and sulfur trioxide with a solid inorganic alkali selected from the group consisting of calcium oxide, calcium hydroxide, calcium carbonate, magnesium oxide, magnesium carbonate, sodium hydroxide, sodium carbonate, potassium hydroxide and potassium carbonate, said inorganic alkali being at an equilibrium condition with respect to reaction with sulfur dioxide, whereby sulfur trioxide reacts with said alkali without sulfur dioxide absorption and a second gas stream containing sulfur dioxide and substantially free of sulfur trioxide is produced, and contacting said second gas stream with a solid basic ion exchange resin at a temperature in the range of about 25° C. to 45° C., whereby sulfur dioxide is adsorbed within said resin and a third gas stream substantially free of sulfur oxides is produced.

2. The process of claim 1, in which said first gas stream contains entrained sulfuric acid mist, and said first gas stream is heated to a temperature in the range of 70° C. to 140° C. prior to contacting said first gas stream with said alkali, whereby said mist is evaporated into said first gas stream.

3. The process of claim 1, in which said first gas stream is a waste tail gas from the production of sulfuric acid, and said third gas stream is discharged to atmosphere.

4. The process of claim 1, in which said resin is regenerated after adsorption of sulfur dioxide by terminating the flow of said second gas stream, contacting said resin with a stream of air, said air stream being substantially free of water vapor and at an initial temperature in the range of 80° C. to 130° C., whereby sulfur dioxide is desorbed from said resin into said air stream, and recovering sulfur dioxide from the resulting sulfur dioxide-laden air stream.

5. The process of claim 4, in which said sulfur dioxide-laden air stream is passed to a sulfuric acid production facility, whereby the sulfur dioxide contained in said air stream is converted to sulfuric acid.

6. The process of claim 1, in which said solid basic ion exchange resin is a cross-linked organic polymer containing amine groups.

References Cited

UNITED STATES PATENTS

| | | | |
|---|---|---|---|
| 1,335,348 | 3/1920 | Patrick et al. | 23—161 X |
| 1,798,733 | 3/1931 | Hasche | 55—73 X |
| 3,310,365 | 3/1967 | Dundes et al. | 23—25 |
| 3,343,908 | 9/1967 | Wickert | 23—25 |
| 3,475,121 | 10/1969 | Thornton | 23—178 R |
| 3,556,722 | 1/1971 | Owaki | 23—178 R |

OTHER REFERENCES

Cole et al., Industrial and Engineering Chemistry, vol. 52, No. 10, October 1960, pp. 859–860.

OSCAR R. VERTIZ, Primary Examiner

C. B. RODMAN, Assistant Examiner

U.S. Cl. X.R.

423—540